(No Model.)

J. H. BALL.
WHEEL FELLY.

No. 451,013. Patented Apr. 28, 1891.

Witnesses:
W. W. Mortimer
W. R. Kennedy

Inventor:
J. H. Ball
By Phil. T. Dodge
Atty

UNITED STATES PATENT OFFICE.

JOHN HENRY BALL, OF LEWISHAM, ENGLAND.

WHEEL-FELLY.

SPECIFICATION forming part of Letters Patent No. 451,013, dated April 28, 1891.

Application filed August 1, 1890. Serial No. 360,614. (No model.)

*To all whom it may concern:*

Be it known that I, JOHN HENRY BALL, of Lewisham, in the county of Kent, England, have invented certain Improvements in Fellies, of which the following is a specification.

At the present day it is the practice to manufacture wheels for bicycles and other vehicles with hollow or tubular rims formed from sheet metal with a groove in the outer surface to receive a rubber tire. It is to this class of hollow sheet-metal rims that the present invention relates; and the objects of the invention are, principally, to reduce the cost of manufacture, to produce rims of extreme strength and rigidity in proportion to their weight, and to avoid the evils which attend the welding or brazing of the joints in rims as ordinarily constructed, to give the rim on the inner or base side such thickness that it will firmly support the ends of the spokes. In order to accomplish these ends my rim is constructed from a single strip of sheet metal bent into the required form and having its edges interlocked or hooked together on the inner or hub side, as hereinafter explained.

Figure 1:
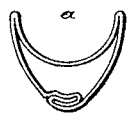
Figure 2:
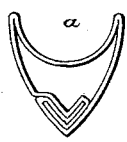
Figure 3:
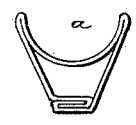
Figure 9:
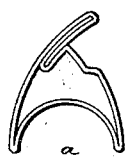
Figure 10:
Figure 11:
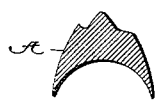
Figure 12:

In the accompanying drawings, Figures 1, 2, and 3 are views showing in cross-section my rim in its preferred form. Figs. 4 to 10 are views showing in cross-section the successive forms which the sheet or strip of metal assumes in the manufacture of the rims shown in Fig. 2. Fig. 11 is a cross-section of the former or die over which the sheet is worked in carrying out the steps illustrated in Figs. 6 to 10. Fig. 12 is a view illustrating another mode of manufacturing my rim, in which the sheet is formed into a round tube before receiving its final shape.

As shown in Figs. 1, 2, and 3, the rim consists of a single sheet so bent that it presents a tubular form with a longitudinal groove or channel *a* in the outer side to receive the usual rubber tire and with the two edges hooked or seamed together at the inner side. It will be observed that each edge of the sheet is bent or folded back over the body portion, so as to present a hooked form in cross-section, and that these hooked edges or lips are interlocked, brazed together, and bent in such form and manner that their lateral separation is impossible, and that they present jointly a thick and strong body of metal on the inner side of the rim well adapted to receive and retain the ends of the spokes which may be inserted therethrough and secured in any ordinary manner.

Figure 4:
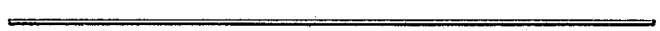
Figure 5:
Figure 6:
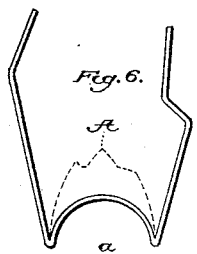
Figure 7:
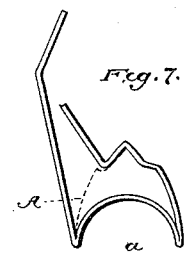
Figure 8:
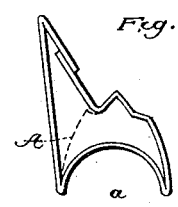

In producing the rim shown in Fig. 2 it is my custom to take a flat sheet of steel or similar metal, such as shown in Fig. 4, and with a length appropriate to the circumference of the required wheel, and first roll the same into the form shown in Fig. 5, its longitudinal edges being raised and the tire-groove *a* formed in the middle. The sheet thus formed is next bent upward at its two edges over a suitable die or former A to the form shown in Fig. 6. The right side of the sheet is then bent inward to the left over the die, as shown in Fig. 7. The left edge is then turned or folded inward over the opposite edge, as shown in Fig. 8. The two edges are then folded or seamed together and bent to the right, as shown in Fig. 9, after which the united edges are bent downward, as shown in Fig. 10, to complete the operation. It will be observed in this figure, as well as in Figs. 1 and 3, that the seamed or lapped portion of the metal lies within the general outline of the rim, or, in other words, that the rim presents on the exterior a smooth unbroken surface and a symmetrical form. The increased thickness of the metal produced by the seam is projected within the rim.

Instead of proceeding, as above described, to give the tube its finished form, in the first instance I may interlock the edges of the sheet in the manner shown in Fig. 12, thereby producing a round tube. The tube thus produced will be indented in its outer side, as indicated in dotted lines, to complete the rim. It may also be bent or indented lengthwise through the middle of the seam to give it the angular form represented in dotted lines, and this in order to give increased strength to the seam and the more effectually prevent the edges from separating.

It will be observed that in Figs. 1 and 2 the rim is creased or bent longitudinally through the middle of the seam, so that the seam or joint presents in cross-section substantially a V form. This effectually prevents the parts from unlocking under the strains to which they are subjected.

The rim in my improved form may be manufactured by any appropriate tools or mechanism, and the sucessive steps may be modified at the will of the manufacturer, provided only they result in a rim essentially such as described and shown.

Whatever the mode of procedure, it is preferred to form the rim in long straight tubular lengths, which are subsequently bent into circular form of suitable size for the required wheel, after the manner generally practiced at the present day in making hollow rims.

In special cases the seams of my rim may be brazed or soldered to give additional strength; but I prefer to dispense with this operation. The omission of the usual brazing operation is advantageous not only because of the reduction in cost, but also because the burning, softening, and weakening of the metal is avoided.

Having thus described my invention, what I claim is—

1. The tubular wheel-rim channeled in the outer side and composed of a single sheet of metal having its two edges hooked together at the inner or hub side of the rim, whereby the rim is given increased strength and thickness on the inner or spoke-receiving side.

2. The tubular metal rim channeled in the outer side to receive a tire, said rim consisting of a single sheet of metal having its edges hooked together on the inner or hub side and creased or bent lengthwise through the middle of the seam to prevent the separation of the edges.

3. A tubular metal rim consisting of a single sheet, its edges hooked together on the inner or hub side, said rim finished with a smooth uninterrupted outer surface, whereby the seam is thrown wholly within the same.

4. The wheel-rim consisting of a single sheet folded or doubled longitudinally into tubular form, with a tire-receiving channel in the outer side and with the two edges hooked together on the inner side, in combination with spokes inserted through said hooked edges to prevent their separation.

In testimony whereof I hereunto set my hand, this 23d day of June, 1890, in the presence of two attesting witnesses.

JOHN HENRY BALL.

Witnesses:
  W. H. HARRIS,
    *Notary Public, Birmingham.*
  ALBERT NEWEY,
    *Clerk to above.*